Feb. 17, 1925.
H. L. FISH
BLOWTORCH
Filed July 30, 1923
1,526,906
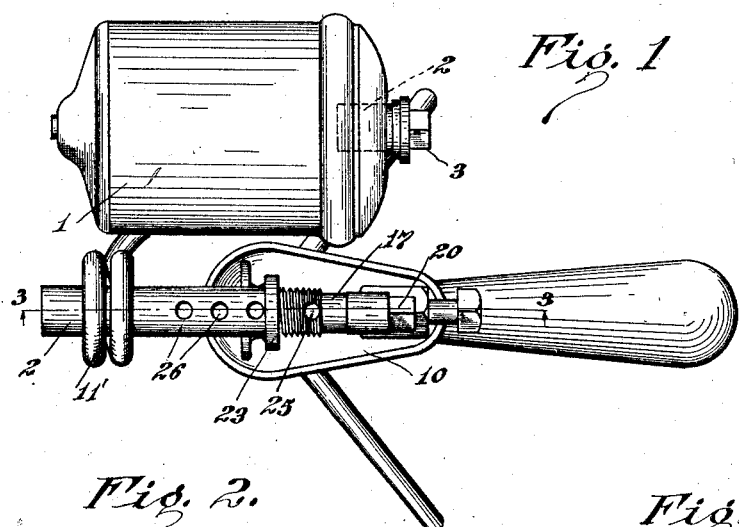
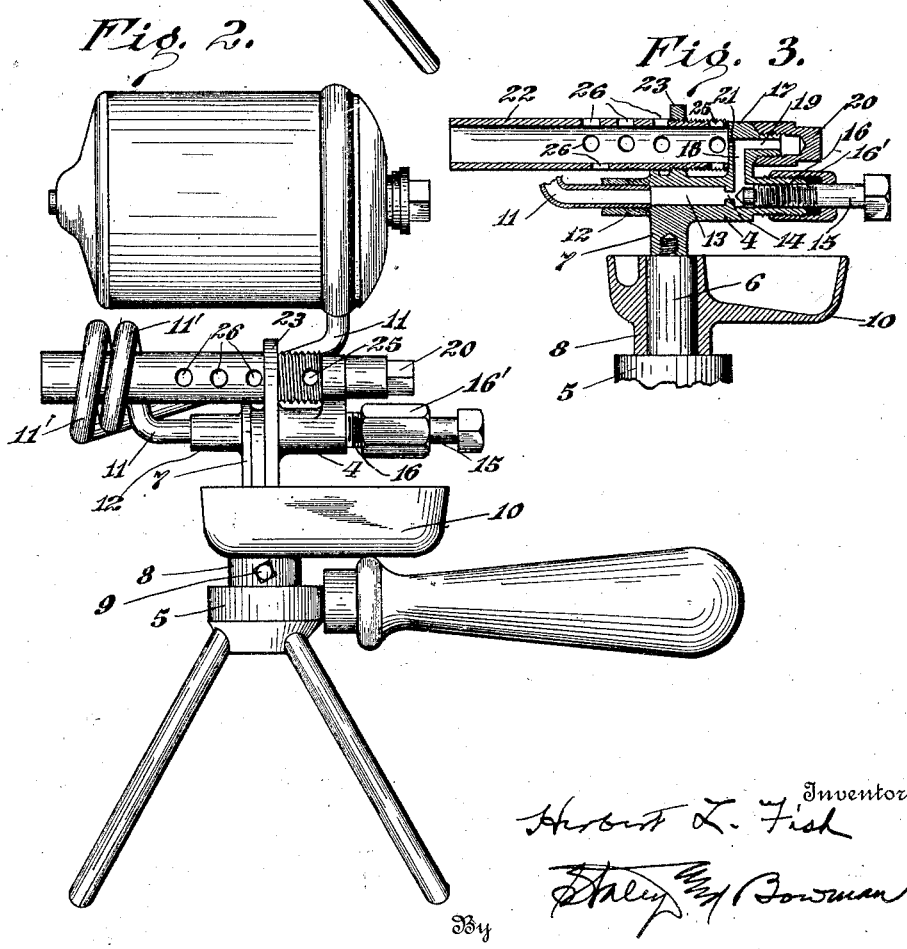

Patented Feb. 17, 1925.

1,526,906

UNITED STATES PATENT OFFICE.

HERBERT L. FISH, OF SPRINGFIELD, OHIO, ASSIGNOR TO HARRY C. DOWNEY, OF SPRINGFIELD, OHIO.

BLOWTORCH.

Application filed July 30, 1923. Serial No. 654,596.

*To all whom it may concern:*

Be it known that I, HERBERT L. FISH, a citizen of the United States, residing at Springfield, in the county of Clark and State of Ohio, have invented certain new and useful Improvements in Blowtorches, of which the following is a specification.

This invention relates to improvements in blow torches.

The object of the invention is to provide a torch which will be simple and economical in construction and efficient in operation.

Referring to the drawings:

Fig. 1 is a top plan view of a torch embodying the improvements.

Fig. 2 is a side elevation.

Fig. 3 is a section on the line 3—3 of Fig. 1.

Referring to the drawings, 1 represents the fuel tank, the head of which has a hollow extension, indicated in dotted lines at 2, which projects a suitable distance into the interior of the tank and is closed by a plug 3 at its outer end; this extension forming the fuel opening for the tank and also providing for a pressure of air in the tank when filled in a well known way. The main body of the generator is indicated at 4 and is supported upon a tripod the head 5 of which has a reduced upwardly-projecting extension 6 terminating in a short stem 7 screwed into the body of the generator. A sleeve 8 is placed about the extension 6 and secured thereto by a set-screw 9, this sleeve having integrally formed therewith a cup-shaped portion 10 to receive a supply of gasoline or other fuel to preliminarily heat the generator. A pipe 11 extends from the tank to the generator body, being fitted in an integral extension 12 projecting forwardly from the body 4. The main body of the generator has a horizontal passageway 13 communicating with the pipe 11 at one end and having a reduced orifice 14 at the opposite end which is controlled by a valve 15 which is threaded in an extension 16 of the body 4, the interior of this extension being threaded to receive a packing gland 16'. Projecting upwardly from the main body 4 is a third integral extension 17 which has therein an inverted L-shaped passageway, the vertical portion 18 of which communicates with the orifice 14. The horizontal portion 19 of this passage has its rear end closed by cap 20 and its other end communicating with a reduced orifice 21 which forms an outlet to a tube 22 which has its rear end threaded into an integral extension 23 of the main body 4; the cap furnishing means of access to the orifice for cleansing purposes. The rear end of this tube adjacent the orifice 21 forms a mixing chamber and is provided with a series of four openings 25 to admit air. The central or burner portion of the tube is provided with a series of ten openings 26, three on the top, three on each side and one on the under side. The tube 11 is formed with two coils 11' through which the forward end of the tube 22 projects.

In operation after fuel has been placed in the cup 10 and the generator parts heated, fuel is admitted from the tank 1 by opening the valve 15 to the required degree, the fuel, in the form of gas, passing through the orifice 21 into the mixing chamber where it is thoroughly mixed with air entering the openings 25 to provide a proper mixture. The fuel mixture thus formed being ignited both at the open forward end of the tube and at each of the openings 26 causes an intense jet of flame to be projected through the open end of the tube as well as small jets of flame from the openings 26, one of the purposes of the small jets being to retard the flame so as to give the proper spot flame at the end of the tube, the combined areas of these openings 26 being suitably proportioned to the cubic content of the burner tube to accomplish this result.

The pipe 11 being coiled about the burner tube 22 at the point where the heat is intense serves to heat the gasoline or other fuel before entering the generator, thus insuring a quick generation of gas, while the flame from the opening 26 in the lower side of the tube striking the extension 12 of the generator, serves to prevent cooling of the generator in cold or windy weather. The jets of flame from the balance of the small openings 26 also provide heat for the tank, which is placed in close proximity to the tube 22 thus generating gas in the tank to an extent to maintain a constant steady pressure in the tank during the burning of the torch, thus eliminating the use of an air pump.

Having thus described my invention, I claim:

1. In a blow torch, a generator body member, a mixing and burner tube supported by said member, said tube having a plurality of flame jet openings between its ends, a fuel supply tube connected with said body member, and coiled about said burner tube, and a fuel tank supported by said fuel supply tube in close proximity to said burner tube to effectively receive the heat of the flames from said flame jet openings.

2. In a blow torch, a generator body having a fuel passageway, a tube supported by said generator body and communicating with said passageway through a reduced orifice, a fuel supply pipe in communication with the other end of said passageway and coiled about said tube, a fuel tank supported by said pipe and communicating therewith, means for supplying air to said tube at a point adjacent said reduced orifice, said tube having a plurality of flame jet openings, one at least of which is arranged to project a flame against a portion of the described fuel supply.

3. In a blow torch, a generator body having a fuel passageway, a fuel tank, a pipe connecting said fuel tank with one end of said passageway, a tube supported by said generator body and communicating with the other end of said passageway through a reduced orifice, means for supplying air to said tube adjacent said orifice, said tube being formed with an outer open end and having a plurality of flame jet openings between said open end and the air supply means, one at least of said flame jet openings being arranged to direct a flame directly against the described fuel supply and the other of said flame jet openings arranged to supply heat to said tank, said flame jet openings being further for the purpose of retarding the flame emitted from the open end of said tube.

In testimony whereof, I have hereunto set my hand this 23rd day of July, 1923.

HERBERT L. FISH.